(12) United States Patent
Ogawa et al.

(10) Patent No.: US 9,821,655 B2
(45) Date of Patent: Nov. 21, 2017

(54) CLUTCH CONTROL DEVICE FOR 4-WHEEL DRIVE VEHICLE

(71) Applicant: Nissan Motor Co., Ltd., Yokohama-shi, Kanagawa (JP)

(72) Inventors: Katsuyoshi Ogawa, Kanagawa (JP); Atsuhiro Mori, Kanagawa (JP); Shunichi Mitsuishi, Kanagawa (JP); Makoto Morita, Kanagawa (JP); Tetsu Takaishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/118,180

(22) PCT Filed: Feb. 24, 2015

(86) PCT No.: PCT/JP2015/055247
§ 371 (c)(1),
(2) Date: Aug. 11, 2016

(87) PCT Pub. No.: WO2015/129692
PCT Pub. Date: Sep. 3, 2015

(65) Prior Publication Data
US 2017/0166053 A1 Jun. 15, 2017

(30) Foreign Application Priority Data

Feb. 28, 2014 (JP) .................................. 2014-038480

(51) Int. Cl.
*F16D 48/06* (2006.01)
*B60K 23/08* (2006.01)
(Continued)

(52) U.S. Cl.
CPC .......... *B60K 23/0808* (2013.01); *B60K 17/34* (2013.01); *B60K 17/344* (2013.01); *B60K 17/35* (2013.01); *B60K 17/3515* (2013.01)

(58) Field of Classification Search
CPC ... B60K 23/0808; F16D 48/06; F16D 48/062; F16D 2500/10425; F16D 2500/10431;
(Continued)

(56) References Cited

U.S. PATENT DOCUMENTS

| 5,441,136 A * | 8/1995 | Greaves | B60K 23/08 180/244 |
| 2010/0094519 A1* | 4/2010 | Quehenberger | B60K 17/35 701/69 |
| 2013/0054104 A1* | 2/2013 | Ogawa | B60K 17/3515 701/69 |

FOREIGN PATENT DOCUMENTS

| DE | 10 2009 005 378 A1 | 4/2010 |
| JP | 62-178436 A | 8/1987 |

(Continued)

*Primary Examiner* — Edwin A Young
(74) *Attorney, Agent, or Firm* — Global IP Counselors, LLP

(57) ABSTRACT

A clutch control device is provided for a four-wheel drive vehicle for transmitting drive force to the rear wheels. The clutch control device includes a dog clutch and a friction clutch, and a 4WD control unit that controls the engagement and disengagement of the dog clutch and the friction clutch. The 4WD control unit has as two-wheel drive modes, a disconnected two-wheel drive mode in which the dog clutch and the friction clutch are released, and a standby two-wheel drive mode in which the dog clutch is engaged and the friction clutch is released. The 4WD control unit is programmed to switch to the standby two-wheel drive mode when uphill movement is detected during the disconnected two-wheel drive mode.

15 Claims, 10 Drawing Sheets

(51) Int. Cl.
*B60K 17/344* (2006.01)
*B60K 17/35* (2006.01)
*B60K 17/34* (2006.01)

(58) Field of Classification Search
CPC ... F16D 2500/1045; F16D 2500/10462; F16D 2500/3124; F16D 2500/3127; F16D 2500/50284; F16D 2500/50825; F16D 2500/70424
See application file for complete search history.

(56) References Cited

FOREIGN PATENT DOCUMENTS

| | | | |
|---|---|---|---|
| JP | 2005-113967 A | 4/2005 | |
| JP | 2010-254058 A | 11/2010 | |
| JP | 2012-61923 A | 3/2012 | |
| WO | 2013/093978 A1 | 6/2013 | |

* cited by examiner

CLUTCH CONTROL DEVICE FOR 4-WHEEL DRIVE VEHICLE

CROSS-REFERENCE TO RELATED APPLICATIONS

This application is a U.S. National stage application of International Application No. PCT/JP2015/055247, filed Feb. 24, 2015, which claims priority to JP Patent Application No. 2014-038480 filed on Feb. 28, 2014, the contents of which are hereby incorporated herein by reference.

BACKGROUND

Field of the Invention

The present invention generally relates to a clutch control device for a four-wheel drive vehicle in which a system for transmitting drive force to auxiliary drive wheels is provided with a dog clutch and a friction clutch.

Background Information

Conventionally, a front wheel drive based four-wheel drive vehicle in which a system for transmitting drive force to the rear wheels is provided with a dog clutch and a friction clutch is known (refer to, for example, Japanese Laid-Open Patent Application No. 2010-254058). In this four-wheel drive vehicle, when switching from the two-wheel drive mode to the four-wheel drive mode, the dog clutch is engaged after the friction clutch is engaged and the drive source side and the rear wheel side of the dog clutch are synchronized. In addition, when switching from the four-wheel drive mode to the two-wheel drive mode, the dog clutch is released after the friction clutch is released.

SUMMARY

In the above-described prior art, in a disconnected two-wheel drive mode in which both clutches are released, the drive system on the auxiliary drive wheel-side is disconnected from the dog clutch, and thus is preferable from the standpoint of fuel efficiency. However, when shifting from the disconnected two-wheel drive mode to a four-wheel drive mode, it is necessary for the dog clutch to be synchronized. Consequently, it requires more time to shift to the four-wheel drive mode than when shifting to the four-wheel drive mode by engaging the friction clutch from a two-wheel drive mode in which the dog clutch is engaged. Therefore, it requires time to transition to the four-wheel drive mode while traveling uphill, when the demand for shifting to the four-wheel drive mode is high, during which there is the risk that the transmission of drive power to the road surface becomes unstable.

In view of the problems described above, an object of the present invention is to provide a clutch control device of a four-wheel drive vehicle in which it is possible to shorten the time for transitioning from a two-wheel drive mode to a four-wheel drive mode when traveling uphill, and to improve the stability of transmitting drive force to the road surface.

In order to achieve the object described above, the present invention is a clutch control device for a four-wheel drive vehicle provided with, as clutches interposed between a drive source and drive wheels, a dog clutch and a friction clutch that are respectively arranged separately to a drive branch-side transmission system path and an auxiliary drive wheel-side transmission system path which sandwich a differential, of a system for transmitting drive force to the auxiliary drive wheels, wherein a clutch control unit that can control the engagement and disengagement of both clutches and can switch between a two-wheel drive mode in which only the main drive wheels are driven and a four-wheel drive mode in which the main drive wheels and the auxiliary drive wheels are driven comprises, as two-wheel drive modes, a disconnected two-wheel drive mode which disengages both clutches, and a standby two-wheel drive mode in which the dog clutch is engaged and the friction clutch is disengaged, and, when an uphill slope is detected when in the disconnected two-wheel drive mode, the clutch control unit switches to the standby two-wheel drive mode.

In the clutch control device for a four-wheel drive vehicle of the present invention, by placement in the disconnected two-wheel drive mode, which disengages both clutches when in the two-wheel drive mode, it is possible to use a two-wheel drive mode that is more advantageous in terms of fuel efficiency than the standby two-wheel drive mode in which only the dog clutch is engaged. On the other hand, when shifting to the four-wheel drive mode, it is possible to shorten the time for transitioning compared to when shifting from the disconnected two-wheel drive mode, and to improve the stability of transmitting drive force to the road surface, by placement in a standby two-wheel drive mode in which the dog clutch is engaged when uphill movement is detected.

DETAILED DESCRIPTION OF THE EMBODIMENTS

Figure 1:
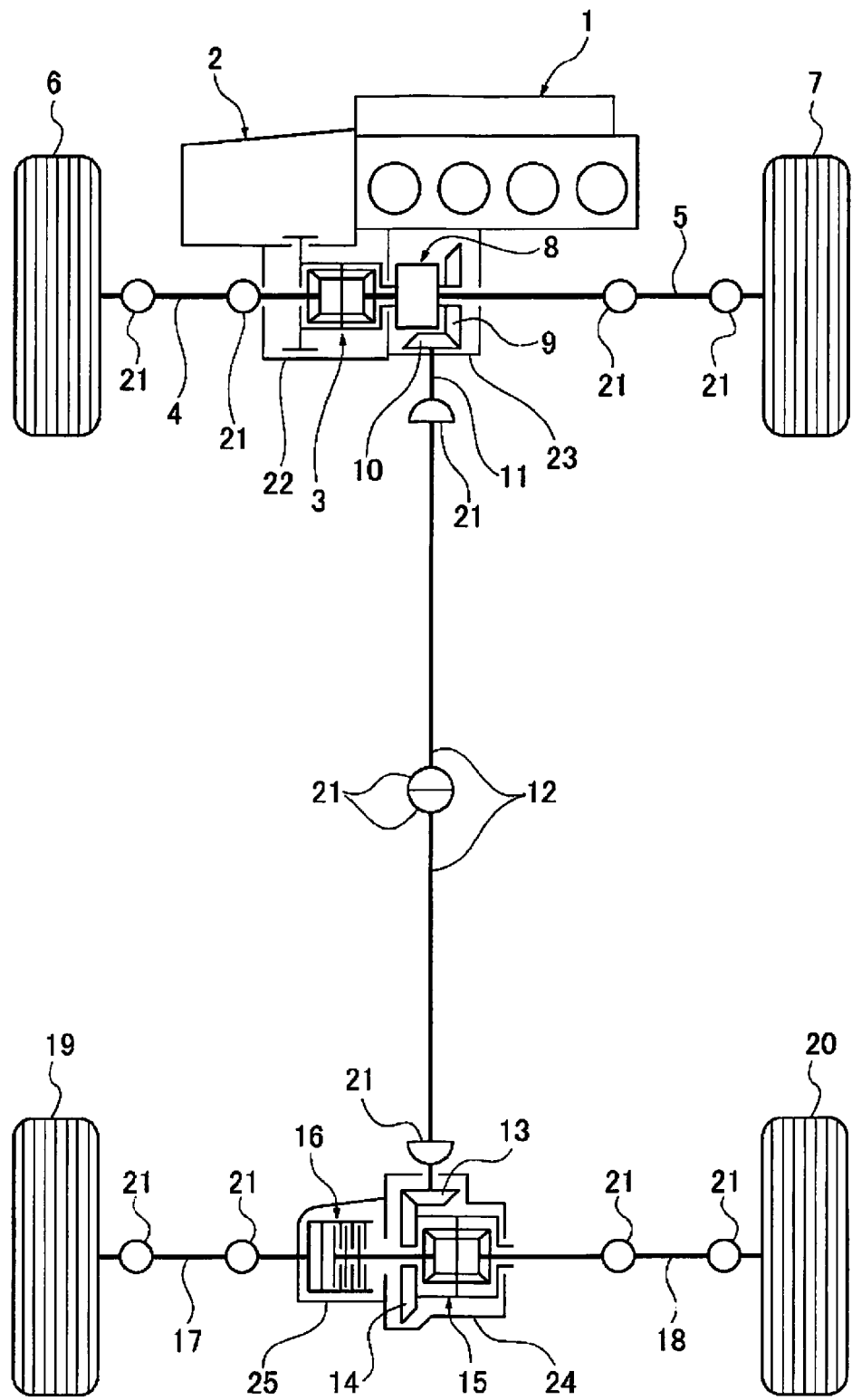
FIG. 1 is a block view of the drive system illustrating the configuration of the drive system of a front wheel drive based four-wheel drive vehicle to which is applied the clutch control device of the first embodiment.

Preferred embodiments for realizing the clutch control device for a four-wheel drive vehicle of the present invention will be described below based on the embodiments illustrated in the drawings.

First Embodiment

Referring initially to FIG. 1, a front wheel drive based four-wheel drive vehicle (one example of a four-wheel drive vehicle) is schematically illustrated with a clutch control device in accordance with a first embodiment.

Drive System Configuration of the Four-Wheel Drive Vehicle

FIG. 1 illustrates the configuration of the drive system of a front wheel drive based four-wheel drive vehicle to which is applied the clutch control device of the first embodiment. The drive system configuration of the four-wheel drive vehicle will be described below based on FIG. 1.

The front wheel drive system of the four-wheel drive vehicle is provided with a transverse engine 1 (drive source), a transmission 2, a front differential 3, a left front wheel drive shaft 4, a right front wheel drive shaft 5, a left front wheel 6 (main drive wheel), and a right front wheel 7 (main drive wheel), as illustrated in FIG. 1. That is, the drive force is transmitted from the transverse engine 1 and the transmission 2 to the left and right front wheel drive shafts 4, 5 via the front differential 3, and constantly drives the left and right front wheels 6 and 7 while allowing a differential rotation.

The rear wheel drive system of the four-wheel drive vehicle comprises a dog clutch 8 (dog clutch), a bevel gear 9, an output pinion 10, a rear wheel output shaft 11, and a propeller shaft 12, as illustrated in FIG. 1. Further provided are a drive pinion 13, a ring gear 14, a rear differential 15, an electronically controlled coupling 16 (friction clutch), a left rear wheel drive shaft 17, a right rear wheel drive shaft 18, a left rear wheel 19 (auxiliary drive wheel), and a right rear wheel 20 (auxiliary drive wheel). In FIG. 1, a universal joint 21 is provided.

That is, the drive system of the four-wheel drive vehicle is configured to be a drive system in which a two-wheel drive mode (i.e., disconnected two-wheel drive mode), in which both the dog clutch 8 and the electronically controlled coupling 16 are disengaged, can be selected. In a disengaged state of the dog clutch 8 and the electronically controlled coupling 16, friction loss and oil stirring loss are suppressed and improved fuel efficiency is achieved by arresting the rotation of the propeller shaft 12, etc., between the dog clutch 8 and the electronically controlled coupling 16.

Figure 2:
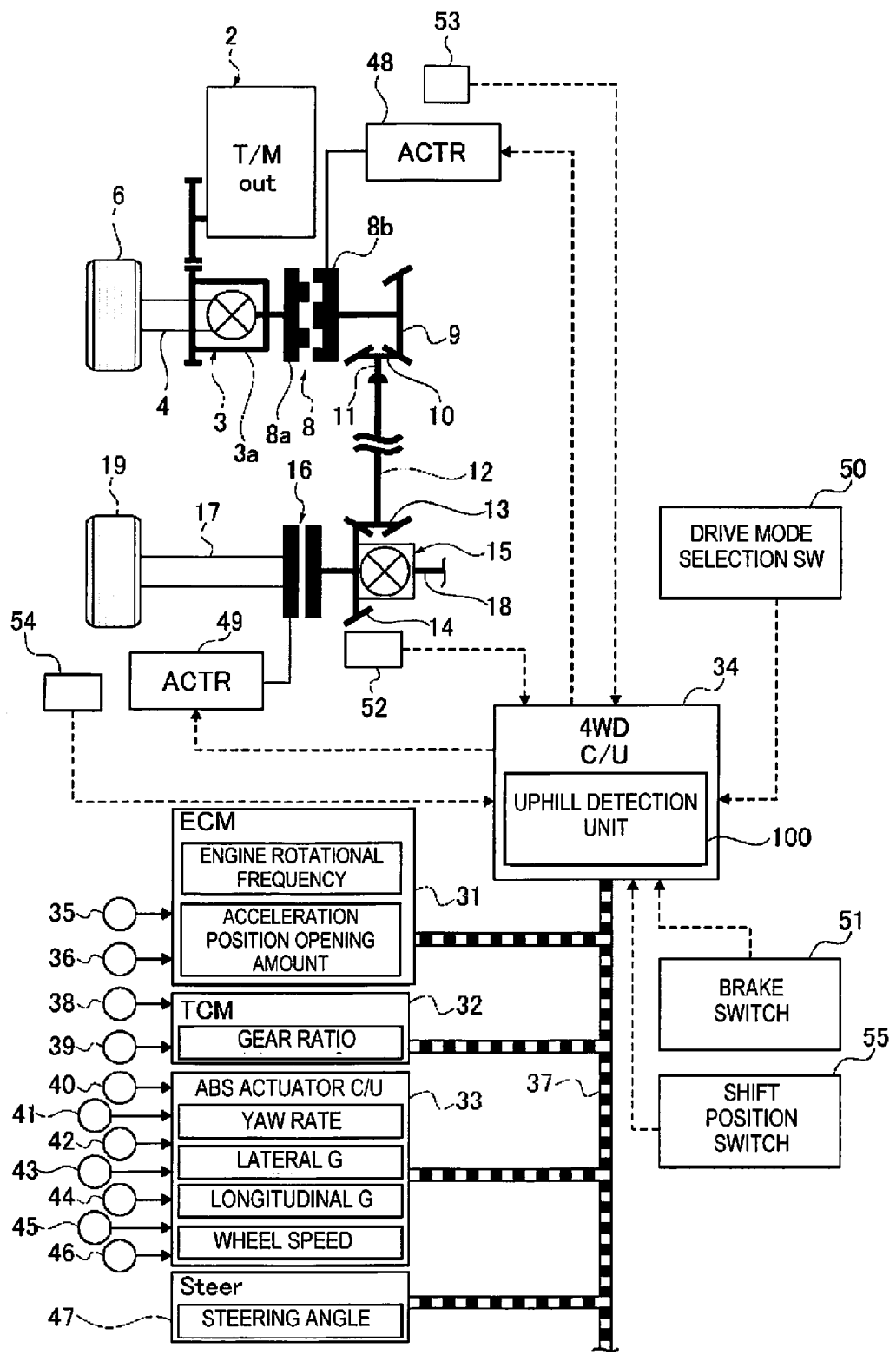
FIG. 2 is a block view of the control system illustrating the configuration of the control system of the front wheel drive based four-wheel drive vehicle to which is applied the clutch control device of the first embodiment.

The dog clutch 8 is a dog clutch that is provided at a drive branch position from the left and right front wheels 6 and 7 to the left and right rear wheels 19 and 20, and that separates the system for transmitting drive force to the left and right rear wheels 19 and 20 from the system for transmitting drive force to the left and right front wheels 6 and 7 by releasing the clutch. The dog clutch 8 is disposed in a position upstream of the bevel gear 9 and the output pinion 10, configuring a transfer mechanism, provided at a drive branch position to the left and right rear wheels 19 and 20. In addition, an input side meshing member 8a of the dog clutch 8 illustrated in FIG. 2 is connected to a differential case 3a of the front differential 3, and an output side meshing member 8b of the dog clutch 8 is connected to the bevel gear 9.

Again with reference to FIG. 1, the dog clutch 8, the bevel gear 9, the output pinion 10, and a portion of the rear wheel output shaft 11 are incorporated in a transfer case 23 that is fixed to a position adjacent to the front differential housing 22. For example, a dog clutch in which one of a pair of meshing members 8a and 8b (refer to FIG. 2) is a fixing member and the other is a movable member, in which a spring that biases in the engagement direction is provided between the fixing member and the movable member, and in which a screw groove that can be fitted with a solenoid pin is formed on the outer perimeter of the movable member, is used as this dog clutch 8. When the solenoid pin is projected and fitted to the screw groove, this dog clutch 8 releases the engagement due to the movable member making a stroke in the releasing direction while being rotated and the stroke amount exceeding a predetermined amount. On the other hand, when the dog clutch 8 is engaged and the fitting of the solenoid pin with respect to the screw groove is disengaged, the movable member makes a stroke in the engaging direction toward the fixing member due to the biasing force of the spring, or the like, and the teeth of the two 8a and 8b are meshed and engaged.

The electronically controlled coupling 16 is a friction clutch that is provided in a downstream position of the dog clutch 8, and that allocates a portion of the drive force from the transverse engine 1 to the left and right rear wheels 19 and 20, in accordance with the clutch engagement capacity. This electronically controlled coupling 16 is configured to be disposed in the position of the left rear wheel drive shaft 17, which extends to the left rear wheel 19, downstream of the bevel gear 9 and the output pinion 10, which configure the transfer mechanism, via the propeller shaft 12 and the rear differential 15. An input side clutch plate of the electronically controlled coupling 16 is connected to a left side gear of the rear differential 15, and an output side clutch plate is connected to a left rear wheel drive shaft 17.

Also, this electronically controlled coupling 16 is incorporated in a coupling case 25 that is fixed in a position adjacent to the rear differential housing 24. For example, an electronically controlled coupling comprising a multi-plate friction clutch in which a plurality of input-side and output-side plates are alternately arranged, a fixed cam piston (not shown) and a movable cam piston (not shown), which have opposing cam surfaces, and a cam member (not shown) that is interposed between the opposing cam surfaces, is used as this electronically controlled coupling 16.

The engagement of the electronically controlled coupling 16 is carried out by rotating the movable cam piston (not shown) in a predetermined engaging direction with an electric motor (electronically controlled coupling actuator 49 illustrated in FIG. 2). The movable cam piston (not shown) is moved in a clutch engaging direction in accordance with the rotation angle to increase the frictional engagement force of the multi-plate friction clutch, due to a cam action that expands the piston gap. The release of the electronically controlled coupling 16 is carried out by rotating the movable cam piston (not shown) in the opposite direction of the engaging direction with the electric motor (electronically controlled coupling actuator 49 illustrated in FIG. 2). The movable cam piston (not shown) makes a stroke in the clutch disengaging direction in accordance with the rotation angle to decrease the frictional engagement force of the multi-plate friction clutch due to a cam action that reduces the piston gap.

Control System Configuration of the Four-Wheel Drive Vehicle

FIG. 2 illustrates the configuration of the drive system of a front wheel drive based four-wheel drive vehicle to which is applied the clutch control device of the first embodiment. The control system configuration of the four-wheel drive vehicle will be described below based on FIG. 2.

The control system of the four-wheel drive vehicle is provided with an engine control module 31, a transmission control module 32, an ABS actuator control unit 33, and a 4WD control unit 34, as illustrated in FIG. 2. Each of the control modules and each of the control units 31-34 are configured by an arithmetic processing unit, such as a computer.

The engine control module 31 is a control device of the transverse engine 1, which inputs detection signals from an engine rotational frequency sensor 35, an accelerator position opening amount sensor 36, and the like, as vehicle state detection devices. Engine rotational frequency information and accelerator position opening amount information (ACC information) are input from this engine control module 31 to the 4WD control unit 34 via a CAN communication line 37.

The transmission control module 32 is a control device of the transmission 2, which inputs detection signals from a transmission input rotational frequency sensor 38, the transmission output rotational frequency sensor 39, and the like, as vehicle state detection devices. Gear ratio information (gear ratio information) is input from this transmission control module 32 to the 4WD control unit 34 via the CAN communication line 37.

The ABS actuator control unit 33 is a control device of an ABS actuator which controls the brake fluid pressure of each wheel, which inputs detection signals from a yaw rate sensor 40, a lateral G sensor 41, a longitudinal G sensor 42, wheel speed sensors 43, 44, 45, 46, and the like, as vehicle state detection devices. Yaw rate information, lateral G information, longitudinal G information, and wheel speed information of each wheel, are input from this ABS actuator control unit 33 to the 4WD control unit 34 via the CAN communication line 37. Besides the information described above, steering angle information from a steering angle sensor 47 is input to the 4WD control unit 34 via the CAN communication line 37.

The 4WD control unit (clutch control unit) 34 is an engagement and disengagement control device of the dog clutch 8 and the electronically controlled coupling 16, and carries out a calculation step based on various input information from each of the sensors as vehicle state detection devices. The control unit outputs drive control commands to a dog clutch actuator 48 (solenoid) and an electronically controlled coupling actuator 49 (electric motor). Here, besides the CAN communication line 37, a drive mode selection switch 50, a brake switch 51 that detects the presence/absence of a braking operation, a ring gear rotational frequency sensor 52, a dog clutch stroke sensor 53, a motor rotation angle sensor 54, a shift position switch 55, and the like are provided as sources of input information.

The drive mode selection switch 50 is a switch with which a driver switches to select among a "2WD mode," a "lock mode," and an "auto mode," which are switching modes between a two-wheel drive state and a four-wheel drive state. When the "2WD mode" is selected, a front wheel drive 2WD state, in which the dog clutch 8 and the electronically controlled coupling 16 are released, is maintained. When the "lock mode" is selected, a full 4WD state, in which the dog clutch 8 and the electronically controlled coupling 16 are engaged, is maintained. Furthermore, when the "auto mode" is selected, the engagement and disengagement of the dog clutch 8 and the electronically controlled coupling 16 are automatically controlled in accordance with the vehicle state (vehicle speed VSP, accelerator position opening amount ACC), and the state is automatically switched between the two-wheel drive state and the four-wheel drive state. In the present first embodiment, the vehicle speed VSP is basically calculated from the wheel speed of the left and right rear wheels 19 and 20 as the auxiliary drive wheels.

The ring gear rotational frequency sensor 52 is a sensor for acquiring output rotational frequency information of the dog clutch 8 and which calculates the output rotational frequency of the dog clutch 8 by taking into consideration the rear side gear ratio and the front side gear ratio upon calculation with respect to the detected value of the ring gear rotational frequency. The input rotational frequency information of the dog clutch 8 is obtained by calculating the average value of the left and right front wheel speeds.

Drive Mode Switching Configuration

Figure 3:
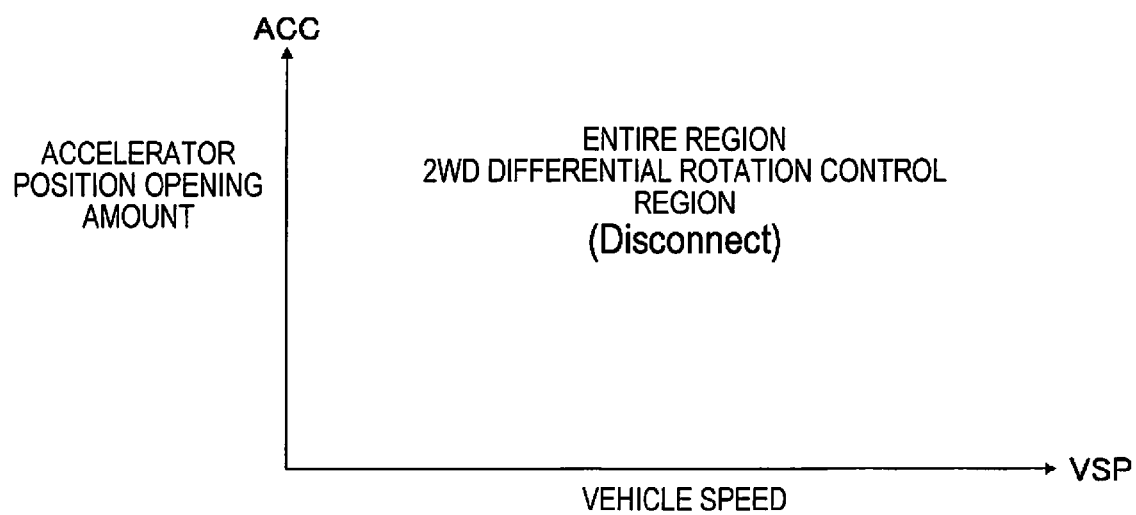
FIG. 3 is a basic map view illustrating a drive mode switching map corresponding to the vehicle speed and the accelerator position opening amount used in the clutch control, when the "auto mode" is selected of the first embodiment.

When the "auto mode" is selected, the drive mode is switched in accordance with the vehicle speed VSP and the accelerator position opening amount ACC based on the drive mode switching map illustrated in FIG. 3, but in the present first embodiment, the mode is set to a disconnected, differential rotation control mode across the entire ranges of the vehicle speed VSP and the accelerator position opening amount ACC. Details of this disconnected, differential rotation control mode will be described below, but normally, the state is placed in a two-wheel drive state of the disconnected, two-wheel drive mode, and when a differential rotation between the left and right front wheels 6 and 7 and the left and right rear wheels 19 and 20 occurs, a control to switch to the four-wheel drive mode is executed.

Figure 4:
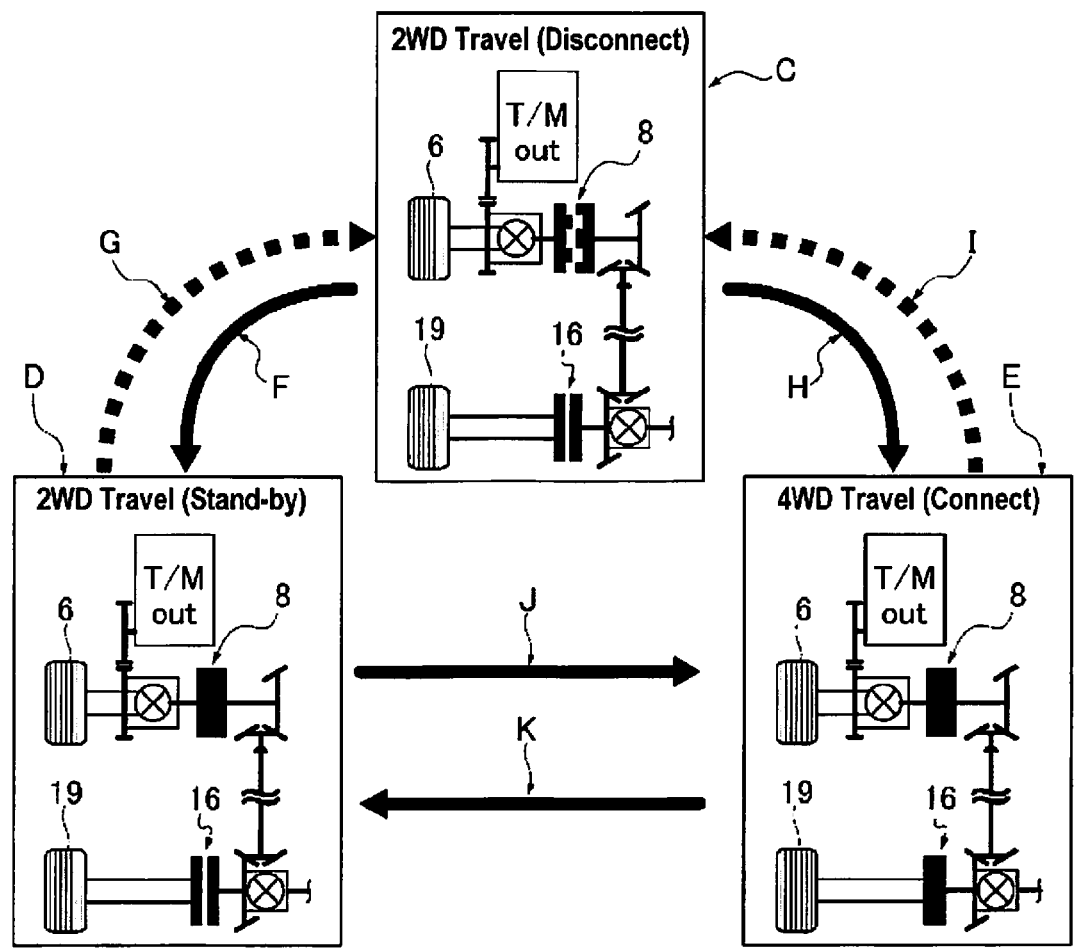
FIG. 4 is a drive mode transition view illustrating the switching transition of the drive mode (disconnected two-wheel drive mode/standby two-wheel drive mode/connected four-wheel drive mode) according to the clutch control by the clutch control device of the first embodiment.

FIG. 4 illustrates the switching transitions of the drive mode (disconnected two-wheel drive mode/standby two-wheel drive mode/connected four-wheel drive mode). The disconnected two-wheel drive mode (Disconnect) is a 2WD travel (Disconnect) mode in which both the dog clutch 8 and the electronically controlled coupling 16 are released, as illustrated in frame C of FIG. 4. Basically, in this disconnected two-wheel drive mode, a front wheel drive 2WD travel (Disconnect) in which drive force is transmitted only to the left and right front wheels 6 and 7 is maintained. However, if wheel slip occurs in the left and right front wheels 6 and 7 during 2WD travel in the disconnected two-wheel drive mode and the wheel slip amount (or the wheel slip rate) exceeds a threshold value, the drive force is distributed to the left and right rear wheels 19 and 20 to carry out a differential rotation control to suppress the wheel slip. During this differential rotation control, the electronically controlled coupling 16 is first frictionally engaged; thereafter, if a rotation synchronization state is determined, the dog clutch 8 is engaged to distribute the drive force to the left and right rear wheels 19 and 20. The drive force distribution to the left and right rear wheels 19 and 20 is adjusted by controlling the transmission torque of the electronically controlled coupling 16.

When the standby two-wheel drive mode (Standby) is selected, the travel mode becomes 2WD travel (Standby), in which the dog clutch 8 is engaged and the electronically controlled coupling 16 is released, as illustrated in frame D of FIG. 4. Basically, in this standby two-wheel drive mode, a front wheel drive 2WD travel (Standby) in which drive force is transmitted only to the left and right front wheels 6 and 7 is maintained. However, if wheel slip occurs in the left and right front wheels 6 and 7 during 2WD travel in the standby two-wheel drive mode and the wheel slip amount (or the wheel slip rate) exceeds a threshold value, the drive force is distributed to the left and right rear wheels 19 and 20 to carry out a differential rotation control to suppress the wheel slip. In this differential rotation control in the standby two-wheel drive mode, since the dog clutch 8 is frictionally engaged in advance, only the frictional engagement of the electronically controlled coupling 16 is carried out. Therefore, it is possible to distribute the drive force to the left and right rear wheels 19 and 20 with good responsiveness.

The connected four-wheel drive mode (Connect) is a 4WD travel (Connect) mode in which both the dog clutch 8 and the electronically controlled coupling 16 are engaged, as illustrated in frame E of FIG. 4. Basically, in this connected four-wheel drive mode (Connect), a drive force distribution control is carried out which achieves the optimum drive force distribution to the left and right front wheels 6 and 7, and to the left and right rear wheels 19 and 20 that is suited to the road conditions. However, if a turning state of the vehicle is determined during 4WD travel from information from the steering angle sensor 47, the yaw rate sensor 40, the lateral G sensor 41, or the longitudinal G sensor 42, a control is carried out in which the engagement capacity of the electronically controlled coupling 16 is decreased to reduce the possibility of the occurrence of a tight corner braking phenomenon.

The switching transition speed of 2WD travel (Disconnect)→2WD travel (Standby) (arrow F in FIG. 4) is configured to be fast, and the switching transition speed of 2WD travel (Standby)→2WD travel (Disconnect) (arrow G in FIG. 4) is configured to be slow. Similarly, the switching transition speed of 2WD travel (Disconnect)→4WD travel (Connect) (arrow H in FIG. 4) is configured to be fast and the switching transition speed of 4WD travel (Connect)→2WD travel (Disconnect) (arrow I in FIG. 4) is configured to be slow. In contrast, the switching transition speed of 2WD travel (Standby)→4WD travel (Connect) (arrow J in FIG. 4) is configured to be the same fast speed as the switching transition speed of 4WD travel (Connect)→2WD travel (Standby) (arrow K in FIG. 4).

Clutch Control Configuration

Figure 5:
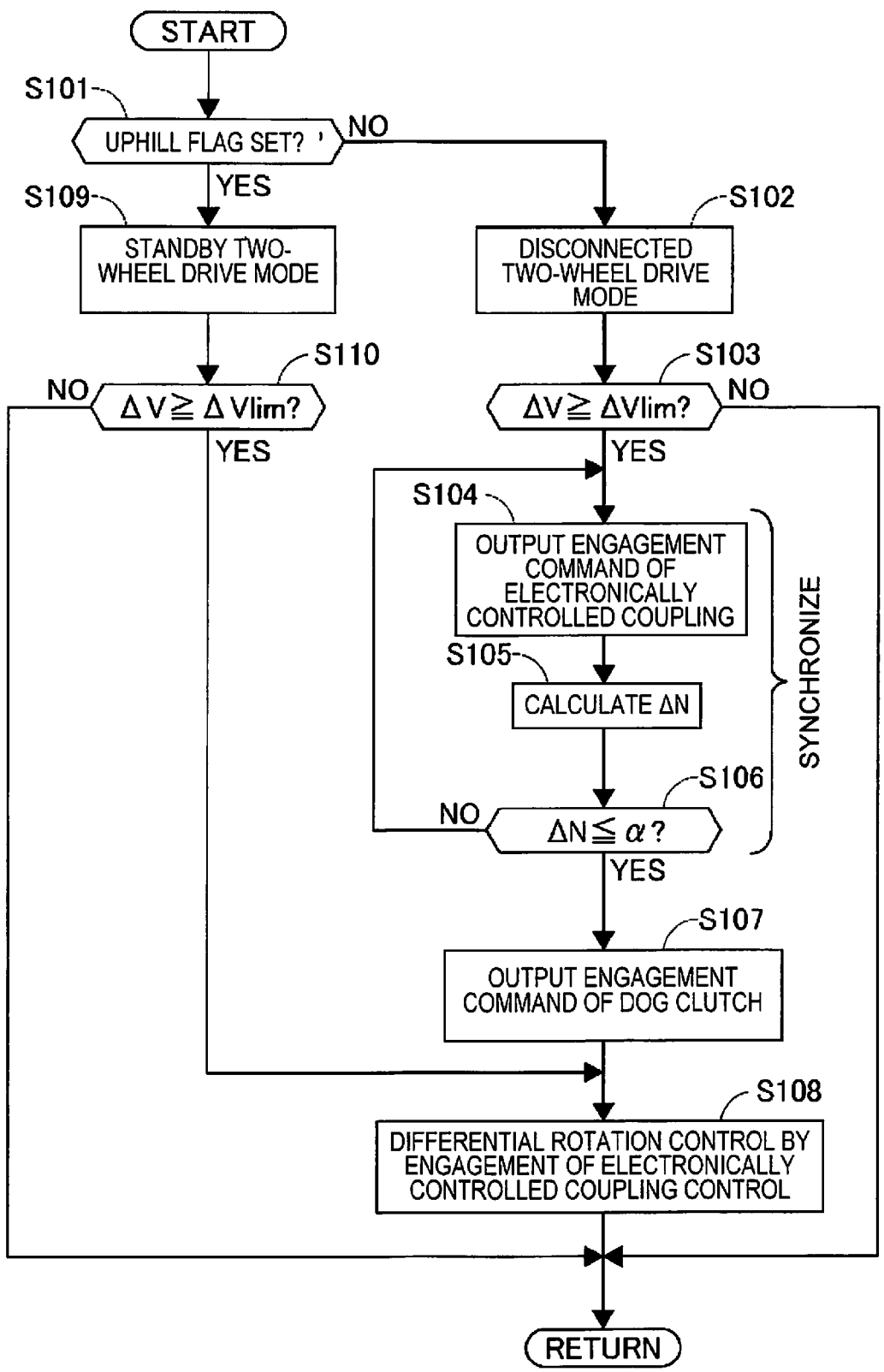
FIG. 5 is a flowchart illustrating the flow of a set of clutch control process during "auto mode" that is executed in the 4WD control unit of the clutch control device for a four-wheel drive vehicle of the first embodiment.

FIG. 5 illustrates the flow of the clutch control process that is executed in the 4WD control unit 34 when in the "auto mode." The switching among the above-described disconnected two-wheel drive mode (2WD travel (Disconnect)), the standby two-wheel drive mode (2WD travel (Standby)), and the differential rotation control (4WD travel (Connect)) is carried out based on a detection of uphill movement and the occurrence of a differential rotation. Prior to describing the flowchart of FIG. 5, the configuration with which to carry out a detection of uphill movement will be described first.

This detection of uphill movement may be carried out by, for example, providing a tilt sensor that detects a longitudinal tilting of the vehicle, but the present first embodiment is configured to carry out the detection by an output of an existing vehicle-mounted sensor.

The uphill detection unit (uphill sensor) 100 illustrated in FIG. 2 is for detecting an uphill movement during travel, and this determination of uphill movement during travel is carried out by executing one or multiple of the following processes a-c.

a. An uphill slope is determined when the actual vehicle speed is lower than the vehicle speed corresponding to a flat road, obtained from the acceleration based on the engine torque, by exceeding a predetermined value, based on the relationship between the vehicle speed, the longitudinal acceleration of the vehicle, and the engine torque.

b. An uphill slope is determined when the actual vehicle speed is lower than the vehicle speed when traveling on a flat road based on the drive force and the gear shift stage by a predetermined value or more, according to the relationship between the drive force of the vehicle, the gear shift stage, and the vehicle speed.

c. An uphill slope is determined when the value obtained by subtracting various resistance (air resistance, road surface resistance, etc.), excluding gradient resistance, from the travel drive force is greater than a predetermined value (a gradient resistance is being generated).

In addition, this uphill detection unit 100 can utilize a configuration for detecting an uphill road in an existing hill assist brake control device.

Next, the flow of the process of the switching control between the two-wheel drive mode and the four-wheel drive mode of the 4WD control unit will be described based on the flowchart of FIG. 5. In Step S101, it is determined whether or not an uphill flag is currently set (detection of uphill movement); the process proceeds to Step S102 if an uphill flag is not set, and the process proceeds to Step S109 when an uphill flag is set.

In Step S102, to which the process proceeds when an uphill flag is not set, the disconnected two-wheel drive mode is set based on the switching map of FIG. 3; then, the process proceeds to Step S103 and beyond to execute a differential rotation control in the disconnected two-wheel drive mode. That is, it is determined whether or not the differential rotation $\Delta V$ between the left and right front wheels 6 and 7 and the left and right rear wheels 19 and 20 has exceeded a slip determination threshold value $\Delta V$lim (whether or not a drive wheel slip has occurred). Then, if a differential rotation $\Delta V$ that exceeds the slip determination threshold value $\Delta V$lim occurs, a differential rotation control is carried out after carrying out the synchronization process of Steps S104-S107 and setting the mode to the connected four-wheel drive mode. If a differential rotation $\Delta V$ that exceeds the slip determination threshold value $\Delta V$lim does not occur in Step S103, one set of steps is ended and the process returns to Step S101.

The process until the execution of the above-described differential rotation control will now be described: first, an engagement command of the electronically controlled coupling 16 is output in Step S104. The drive force of the left and right rear wheels 19 and 20 is thereby transmitted to the bevel gear 9, and the rotation of the output side meshing member 8b of the dog clutch 8 is increased. In the following Step S105, the differential rotation $\Delta N$ between the input side meshing member 8a and the output side meshing member 8b of the dog clutch 8 is calculated, and in the following Step S106, it is determined whether or not the state has become a synchronous state in which this differential rotation $\Delta N$ is less than or equal to a synchronization determination threshold value $\alpha$.

Then, when a synchronous state is determined, the process proceeds to Step S107, in which the dog clutch 8 is engaged for placement in the connected four-wheel drive state, and the process proceeds to Step S108. In the following Step S108, a differential rotation control by an engagement of the electronically controlled coupling 16 is executed. This differential rotation control is ended when the differential rotation between the left and right front wheels 6 and 7 and the left and right rear wheels 19 and 20 is eliminated; then, the process returns to Step S101, and the mode is returned to a two-wheel drive mode corresponding to a state in which an uphill flag is set.

In Step S109, to which the process proceeds when an uphill flag is set in Step S101 (when uphill movement is detected), the mode is controlled to be in the standby two-wheel drive mode. This standby two-wheel drive mode is a two-wheel drive mode in which the dog clutch 8 is engaged, as described above. When switching to this standby two-wheel drive mode during travel, engagement is carried out after synchronizing the dog clutch 8, in the same manner as in Steps S104-S107 during differential rotation control from the disconnected two-wheel drive mode described above. In this case, the electronically controlled coupling 16 is released after engaging the dog clutch 8. On the other hand, when the vehicle is stopped, or when uphill movement is detected immediately before stopping, the dog clutch 8 is engaged without a synchronization operation. At this time, if the engagement were not to be completed due to tooth contact in the dog clutch 8, engagement is carried out by the biasing force of a spring at the point in time in which a differential rotation is generated upon starting.

In the following Step S110, it is determined whether or not a differential rotation $\Delta V$ (wheel slip) that exceeds the slip determination threshold value $\Delta V$lim has been generated between the left and right front wheels 6 and 7 and the left and right rear wheels 19 and 20. If a differential rotation $\Delta V$ that exceeds the slip determination threshold value $\Delta V$lim has been generated, the process proceeds to Step S108, and a differential rotation control that suppresses wheel slip is carried out by a drive force distribution control to the left and right rear wheels 19 and 20 by an engagement control of the electronically controlled coupling 16. In this case, since the dog clutch 8 is engaged in advance, only the frictional engagement of the electronically controlled coupling 16 needs to be carried out; thus, it is possible to distribute the drive force to the left and right rear wheels 19 and 20 with good responsiveness. If a differential rotation $\Delta V$ that exceeds the slip determination threshold value $\Delta V$lim does not occur in Step S110, one set of process is ended and the process from START are repeated.

Actions of the First Embodiment

Figure 6:
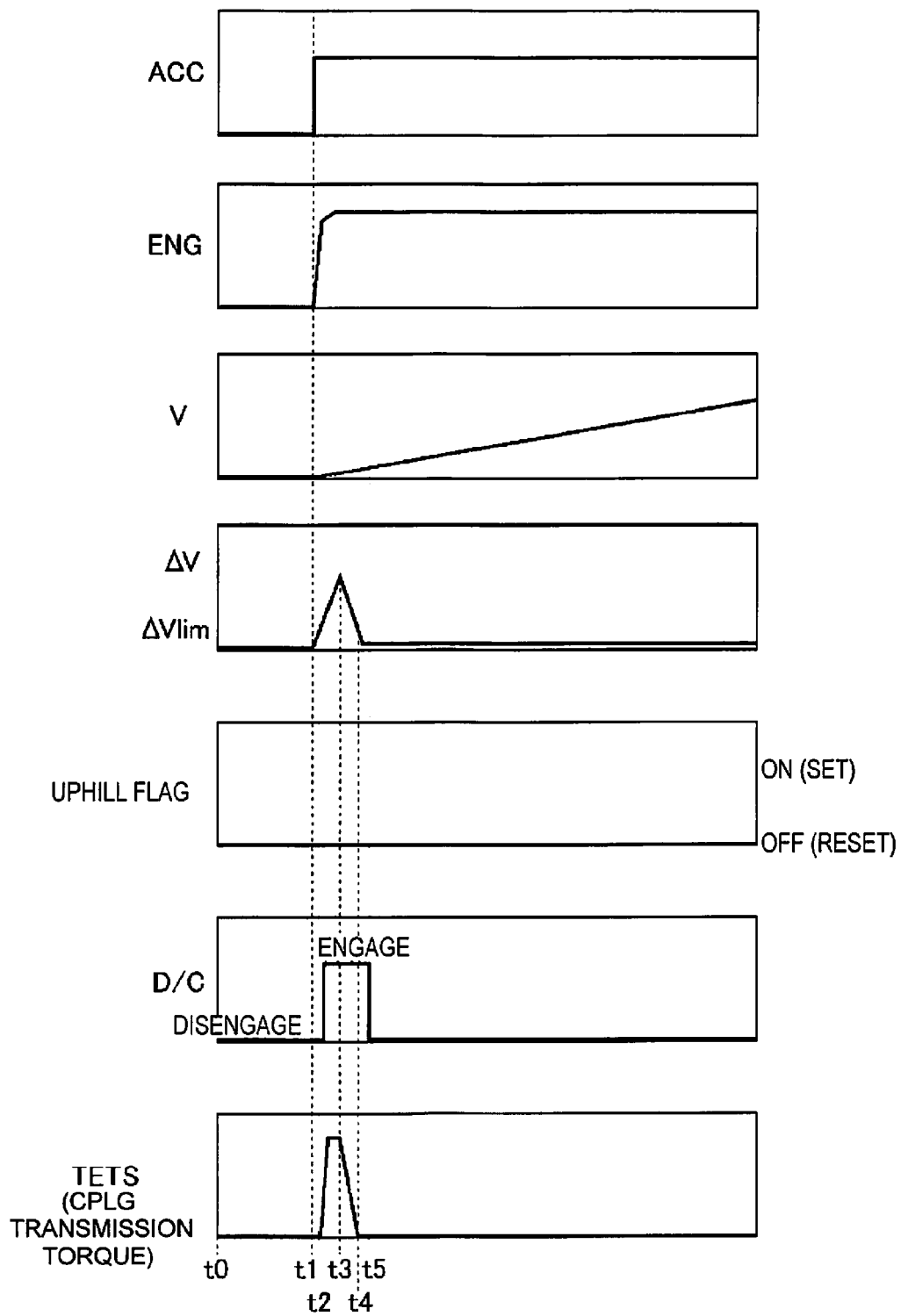
FIG. 6 is a time chart illustrating an example of an operation during non-uphill travel by the clutch control device for a four-wheel drive vehicle of the first embodiment.
Figure 7:
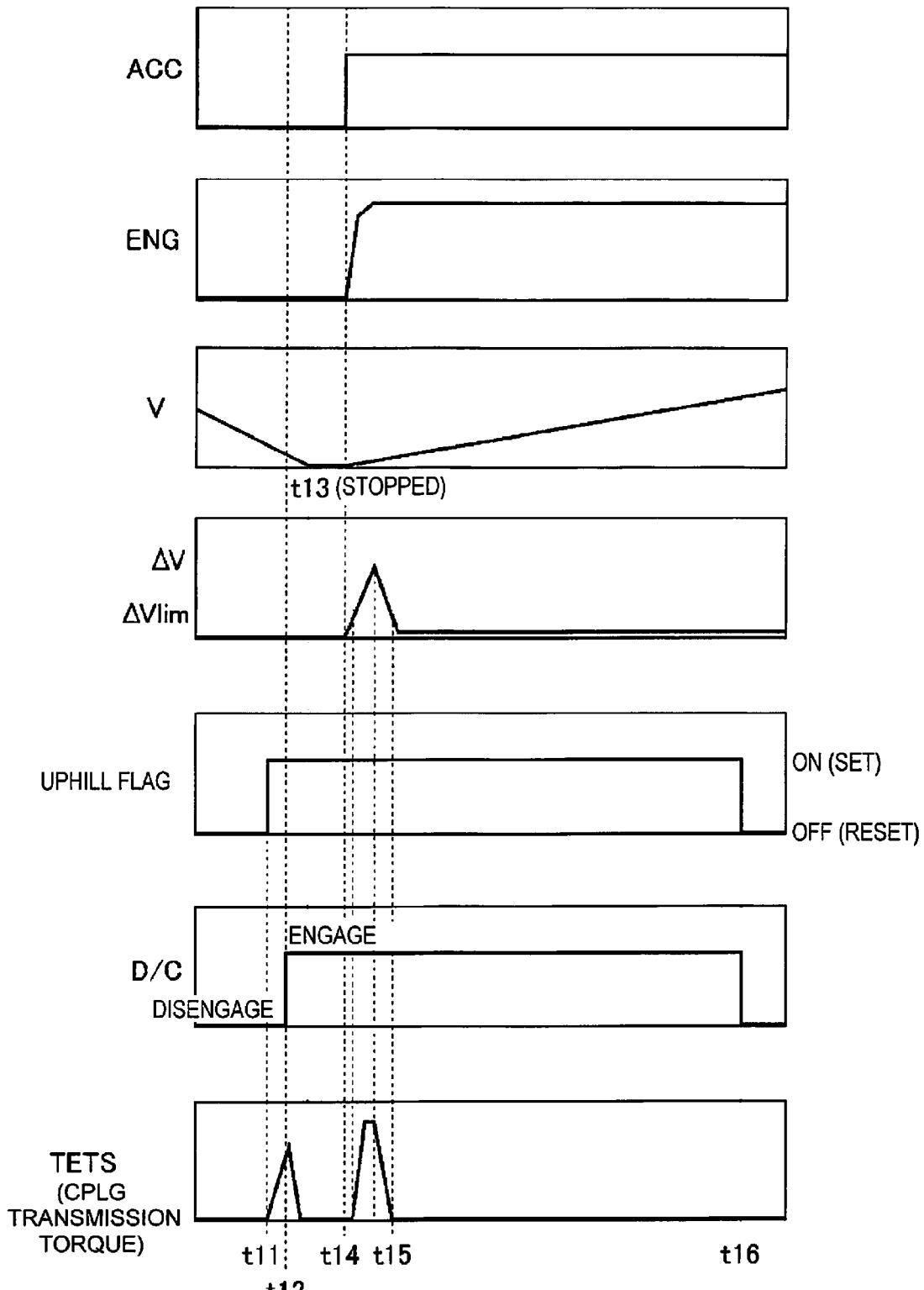
FIG. 7 is a time chart illustrating an example of an operation during uphill travel by the clutch control device for a four-wheel drive vehicle of the first embodiment.

Next, the operations of the first embodiment will be described based on the time charts of FIGS. 6 and 7. FIG. 6 illustrates one example of an operation during non-uphill movement, illustrating an operation when a wheel slip has occurred in the left and right front wheels 6 and 7 upon starting by depressing the accelerator pedal at time t1.

At time t0 in FIG. 6, a non-uphill road is determined, the mode is controlled to the disconnected two-wheel drive mode (Steps of S101-S102), and the dog clutch 8 and the electronically controlled coupling 16 are released. In FIG. 6, TETS indicates a command signal to the electronically controlled coupling 16, and D/C indicates a command signal to the dog clutch 8.

Immediately after time t1, when the accelerator position opening amount ACC has increased by depressing the accelerator pedal from this state, the left and right front wheels 6 and 7 slip, and a differential rotation $\Delta V$ is generated between the left and right front wheels 6 and 7 and the left and right rear wheels 19 and 20. Then, as a result of this differential rotation $\Delta V$ exceeding the slip determination threshold value $\Delta V$lim at time t2 (S103), switching to the connected four-wheel drive mode and a differential rotation control based on the engagement of the electronically controlled coupling 16 are executed (Steps of S104-S108).

That is, first, an engagement command output TETS for increasing the transmission torque of the electronically controlled coupling 16 is executed to carry out synchronization of the input/output side meshing members 8a and 8b of the dog clutch 8 (S104-S106), after which a control output for engaging the dog clutch 8 is carried out (S107). The vehicle is thereby placed in the connected four-wheel drive mode; thenceforth, a differential rotation control for controlling the transmission torque of the electronically controlled coupling 16 is executed in accordance with the differential rotation $\Delta V$ (S108). Therefore, the engagement command output TETS to the electronically controlled coupling 16 is increased in accordance with an increase in the differential rotation $\Delta V$. Then, by placement in the connected four-wheel drive mode, the drive force is distributed to the left and right rear wheels 19 and 20. The slip of the left and right front wheels 6 and 7 is thereby reduced, and after time t3, the differential rotation $\Delta V$ is reduced, allowing the vehicle to be started smoothly.

Then, after time t3, the engagement command output TETS to the electronically controlled coupling 16 is reduced in accordance with a reduction in the differential rotation $\Delta V$, and at time t4, when the differential rotation $\Delta V$ has declined to be less than or equal to a predetermined value (for example, the slip determination threshold value $\Delta V$lim), the differential rotation control is ended and the mode is returned to the disconnected two-wheel drive mode. In this case, as illustrated in the drawing, at time t4, the engagement command output TETS to the electronically controlled coupling 16 is stopped to release the coupling, and the load from the left and right rear wheels 19 and 20 to the propeller shaft 12 is eliminated; thereafter, at time t5, the engagement of the dog clutch 8 is released.

Therefore, after time t5, acceleration and travel is continued in the disconnected two-wheel drive mode. In this manner, during a non-uphill movement (normal), the mode is controlled to be the disconnected two-wheel drive mode. In this disconnected two-wheel drive mode, since only the left and right front wheels 6 and 7 are driven in a state in which the dog clutch 8 and the electronically controlled coupling 16 are released, the components between the bevel gear 9 and the ring gear 14 of the rear wheel drive system are stopped, and the friction loss of the rear wheel side drive system can be reduced.

Next, the control at the time of starting on an uphill road will be described based on FIG. 7. During this control, a vehicle is stopped on an uphill road, and an operation example is illustrated in which the vehicle is started from this stopped state. In this operation example, a vehicle approaches an uphill road at time t11 immediately before stopping, stops at time t13, and starts at time t14.

In this case, an uphill flag is set at time t11 at which the vehicle reaches the uphill road, and the mode is switched from the disconnected two-wheel drive mode to the standby two-wheel drive mode (S101-S109). That is, in the same manner as the operation example illustrated in FIG. 6, the electronically controlled coupling 16 is engaged and the dog clutch 8 is synchronized, after which the dog clutch 8 is engaged (t12), and, following the completion of the engagement, the electronically controlled coupling 16 is released.

Then, since an uphill flag is still set even when the vehicle is stopped, the mode is maintained in the standby two-wheel drive mode. Then, at the time of start from t14, the wheel load of the left and right front wheels 6 and 7, which are the main drive wheels, is reduced on an uphill road, and slip is generated simultaneously with starting. In this case, a differential rotation control is carried out as the connected four-wheel drive mode (S110-S108) in accordance with the differential rotation ΔV of the front and rear; however, since the switch is from the standby two-wheel drive mode, it is possible to switch to the connected four-wheel drive mode by only engaging the electronically controlled coupling 16. Therefore, it becomes possible to immediately suppress slip of the left and right front wheels 6 and 7 and to start the vehicle stably. In addition, by switching to the connected four-wheel drive mode, the left and right rear wheels 19 and 20, the wheel load of which will increase, are driven on an uphill road. Accordingly, an effect to improve stability by switching to the four-wheel drive mode can be reliably obtained at an early stage, compared to when the front wheels are driven after the rear wheels as the main drive wheels have slipped.

Then, in the same manner as the example of FIG. 6, the drive force distribution to the left and right rear wheels 19 and 20 is increased as the differential rotation ΔV is increased, and the engagement command output TETS is reduced as the differential rotation ΔV is reduced. Then, at time t15, when the differential rotation ΔV becomes less than or equal to a set value (for example, the slip determination threshold value ΔVlim), the differential rotation control is ended, the electronically controlled coupling 16 is released, and the mode is returned to the standby two-wheel drive mode. This standby two-wheel drive mode is maintained as long as an uphill flag is set; then, at time t16 when the uphill flag is reset (OFF), the dog clutch 8 is released to control the mode to the disconnected two-wheel drive mode.

Effects of the First Embodiment

Both the effects and actions of the clutch control device for a four-wheel drive vehicle of the first embodiment are listed together below.

1) In the clutch control device for a four-wheel drive vehicle of the first embodiment, in a four-wheel drive vehicle, in which, of the left and right front wheels 6 and 7 and the left and right rear wheels 19 and 20, one pair is set as the main drive wheels which are connected to an engine 1 as the drive source and the other pair is set as the auxiliary drive wheels which are connected to the drive source via a clutch, which comprises plural clutches, that is, a dog clutch 8 as a dog clutch and an electronically controlled coupling 16 as a friction clutch, which are respectively disposed separately in a drive branch-side transmission system path and in an auxiliary drive wheel-side transmission system path that sandwich a rear differential 15, in a system for transmitting drive force to the left and right rear wheels 19 and 20 as the auxiliary drive wheels, where the dog clutch 8 separates the system for transmitting drive force to the left and right rear wheels 19 and 20 from the system for transmitting drive force to the left and right front wheels 6 and 7 by release of the clutch, and the electronically controlled coupling 16 allocates a portion of the drive force from the engine 1 to the left and right rear wheels 19 and 20 in accordance with the clutch engagement capacity, and a 4WD control unit 34 as a clutch control unit that carries out the engagement and disengagement control of the dog clutch 8 and the engagement and disengagement control of the electronic controlled coupling 16 in accordance with the vehicle state that is detected by each of the sensors (35, 36, 38-47, 50-55) as vehicle state detection devices, and which can switch between a two-wheel drive mode in which only the left and right front wheels 6 and 7 are driven and a four-wheel drive mode in which the left and right front wheels 6 and 7 and the left and right rear wheels 19 and 20 are driven, wherein the vehicle state detection devices include an uphill detection unit 100 as an uphill sensor that detects an uphill movement, wherein the 4WD control unit 34 comprises, as the two-wheel drive modes, a disconnected two-wheel drive mode in which the dog clutch 8 and the electronically controlled coupling 16 are released and a standby two-wheel drive mode in which the dog clutch 8 is engaged and the electronically controlled coupling 16 is released, and wherein, when an uphill movement is detected during the disconnected two-wheel drive mode, the control unit switches the mode to the standby two-wheel drive mode. Therefore, when controlling to the disconnected two-wheel drive mode as the two-wheel drive mode, the components between the bevel gear 9 and the ring gear 14 of the rear wheel drive system are stopped, and friction loss does not occur. Accordingly, the deterioration of fuel consumption can be suppressed, and, even in a four-wheel drive vehicle, the fuel efficiency during a two-wheel drive mode can be brought on par with the fuel efficiency of a two-wheel drive vehicle. Moreover, as described above, even when controlling to the disconnected two-wheel drive mode, which has excellent fuel efficiency, the mode is set to the standby two-wheel drive mode in which the dog clutch 8 is engaged when uphill movement is detected. Accordingly, a shift from the two-wheel drive mode to the four-wheel drive mode can be carried out solely by engaging the electronically controlled coupling 16. Therefore, a synchronization operation of the dog clutch 8, such as when switching from the disconnected two-wheel drive mode to the four-wheel drive mode, is not necessary, and it is possible to carry out a shift from the two-wheel drive mode to the four-wheel drive mode in a correspondingly short period of time. Therefore, during a control to the disconnected two-wheel drive mode, it becomes possible to switch to the four-wheel drive mode in a short period of time and to achieve an improvement in travel stability, by switching to the standby two-wheel drive mode on an uphill road when wheel slip is likely to occur.

2) In the clutch control device for a four-wheel drive vehicle of the first embodiment, the 4WD control unit 34 as the clutch control unit controls the mode to the two-wheel drive mode when a differential rotation is not generated between the main drive wheels and the auxiliary drive wheels, switches the mode to the four-wheel drive mode when the differential rotation is generated, and executes an automatic switching control that controls the mode to the disconnected two-wheel drive mode when in the two-wheel drive mode. Therefore, in the automatic switching control, it becomes possible to achieve improved fuel efficiency, as in 1) above, by placement in the disconnected two-wheel drive mode when in the two-wheel drive mode. Moreover, during the automatic switching control, while controlling to the disconnected two-wheel drive mode when in the two-wheel drive mode, the mode is switched to the standby two-wheel drive mode when uphill movement is detected, as in 1) above; therefore, it is possible to carry out a switch to the four-wheel drive mode in a short period of time when a differential rotation occurs. Therefore, it becomes possible to achieve both an improvement in fuel efficiency and an improvement in the travel stability during an uphill movement, when carrying out an automatic switching control between a two-wheel drive mode and a four-wheel drive mode.

3) In the clutch control device for a four-wheel drive vehicle of the first embodiment, the left and right front wheels 6 and 7 are configured as the main drive wheels. Compared with configuring the left and right rear wheels 19 and 20 as the main drive wheels, when the left and right front wheels 6 and 7 are configured as the main drive wheels, wheel slip is more likely to occur in the two-wheel drive mode during uphill movement, and the effect of improving travel stability during placement in a four-wheel drive mode is more significant.

4) In the clutch control device for a four-wheel drive vehicle of the first embodiment, the uphill detection unit 100 determines an uphill movement based on detection by an existing sensor, such as a sensor for vehicle speed, acceleration, engine torque, or the like. Therefore, it becomes possible to reduce the manufacturing cost, compared to adding a sensor for the detection of uphill movement, such as a tilt sensor.

5) In the clutch control device for a four-wheel drive vehicle of the first embodiment, the dog clutch 8 as the dog clutch is disposed in a position upstream of a bevel gear 9 and an output pinion 10, configuring a transfer mechanism, provided at a drive branch position to the left and right rear wheels 19 and 20, as the auxiliary drive wheels, and the electronically controlled coupling 16 as the friction clutch is disposed in the position of the left rear wheel drive shaft 17, which extends to the left rear wheel 19 as an auxiliary drive wheel, downstream of the bevel gear 9 and output pinion 10, as the transfer mechanism, via the propeller shaft 12 and the rear differential 15. Accordingly, in a front wheel drive based four-wheel drive vehicle, when the disconnected two-wheel drive mode is selected, it is possible to effectively suppress friction loss and oil stirring loss, so as to achieve an improvement in fuel efficiency.

Other Embodiments

When describing the other embodiment, configurations common to the first embodiment are assigned the same reference symbols as the first embodiment and the descriptions thereof are omitted, while describing only the differences from the first embodiment.

Second Embodiment

In the clutch control device for a four-wheel drive vehicle of the embodiment, the mode switching characteristic during automatic control is different from the first embodiment.

Figure 8:
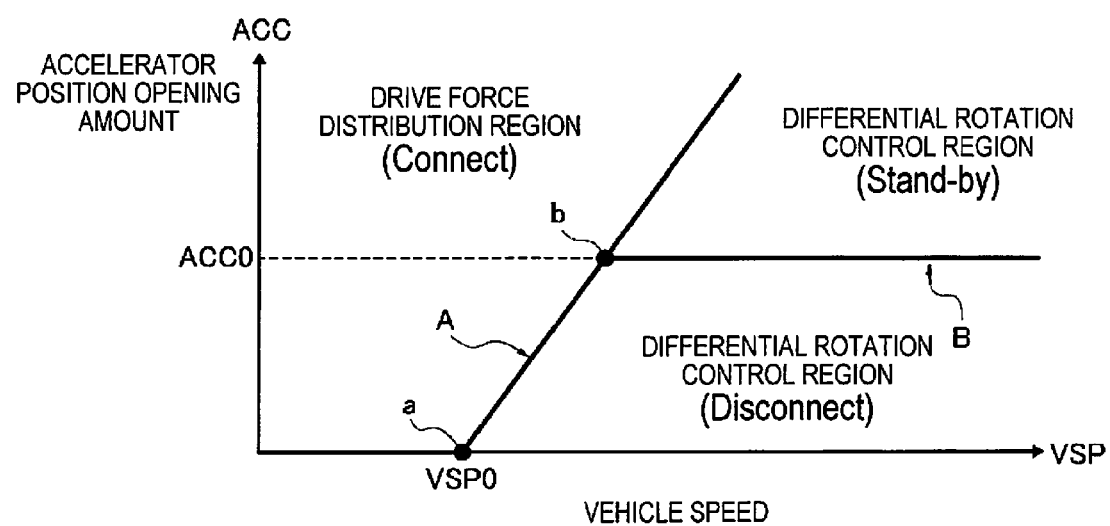
FIG. 8 is a basic map view illustrating a drive mode switching map corresponding to the vehicle speed and the accelerator position opening amount used in the clutch control, when "auto mode" of the second embodiment is selected.

In the present second embodiment, the 4WD control unit 34 switches between the two-wheel drive mode and the four-wheel drive mode based on the drive mode switching map illustrated in FIG. 8. That is, the drive mode switching map is set to be separated into a differential rotation control region (Disconnect), which is a control region for the disconnected two-wheel drive mode, a differential rotation control region (Standby), which is a control region for the standby two-wheel drive mode, and a drive force distribution region (Connect), which is a control region for the connected four-wheel drive mode, in accordance with the vehicle speed VSP and the accelerator position opening amount ACC, as illustrated in FIG. 8. These three regions are separated by a region dividing line A in which the accelerator position opening amount ACC is increased proportionally with the increase in the vehicle speed VSP from a base point a of a set vehicle speed VSP0 at which the accelerator position opening amount is zero, and a region dividing line B of a constant accelerator position opening amount ACC0, which is drawn from an intersection b with the region dividing line A toward the high vehicle speed side.

The differential rotation control region (Disconnect), which is a control region for the disconnected two-wheel drive mode, is set in the region in which the accelerator position opening amount ACC is less than or equal to the set opening amount ACC0, and which is surrounded by the vehicle speed axis line on which the accelerator position opening amount ACC is zero, the region dividing line A, and the region dividing line B. That is, the mode is set in a region in which the frequency of occurrence of differential rotation of the left and right front wheels 6 and 7 and the left and right rear wheels 19 and 20 due to wheel slip is extremely low, since the accelerator position opening amount ACC is less than or equal to the set accelerator position opening amount ACC0, and even if wheel slip occurs, the four-wheel drive requirement is low, so that the slip increases slowly.

The differential rotation control region (Standby), which is a control region for the standby two-wheel drive mode, is set in the region in which the accelerator position opening amount ACC exceeds the set accelerator position opening amount ACC0, and which is surrounded by the region dividing line A and the region dividing line B. That is, the region is set in a region in which, since the accelerator position opening amount ACC exceeds the set accelerator position opening amount ACC0 but the vehicle speed VSP is in a high vehicle speed region, while the 4WD requirement is low, if differential rotation of the left and right front wheels 6 and 7 and the left and right rear wheels 19 and 20 is generated due to wheel slip, there is a high probability that slip will increase rapidly.

The drive force distribution region (Connect), which is a control region for the connected four-wheel drive mode, is set in the region surrounded by the accelerator position opening amount axis line on which the vehicle speed VSP is zero, the vehicle speed axis line on which the accelerator position opening amount ACC is zero, and the region dividing line A. That is, the mode is set in a region in which the 4WD requirement is high, such as when starting or during high-load travel when the vehicle speed VSP is low but the accelerator position opening amount ACC is high.

Then, in the present second embodiment, if an uphill flag is set when the disconnected two-wheel drive mode (Disconnect) is selected, the disconnected two-wheel drive mode is canceled and the mode is switched to the standby two-wheel drive mode.

Therefore, in the second embodiment as well, even if the disconnected two-wheel drive mode is selected on the drive mode switching map, the mode is switched to the standby two-wheel drive mode during uphill travel. Therefore, when the left and right front wheels 6 and 7, which are the drive wheels, slip, the mode is instantaneously switched to the connected four-wheel drive mode, allowing the securing of travel stability. Furthermore, in the second embodiment, it is possible to secure acceleration performance when starting and travel stability when starting, by controlling the mode to the connected four-wheel drive mode in a low-speed travel region.

Third Embodiment

The clutch control device of the third embodiment is an example in which the clutch control device is applied to a rear wheel drive based four-wheel drive vehicle, and the positional relationship of the dog clutch and the friction clutch that sandwich the differential is reversed from the positional relationship thereof in the first embodiment.

Figure 9:
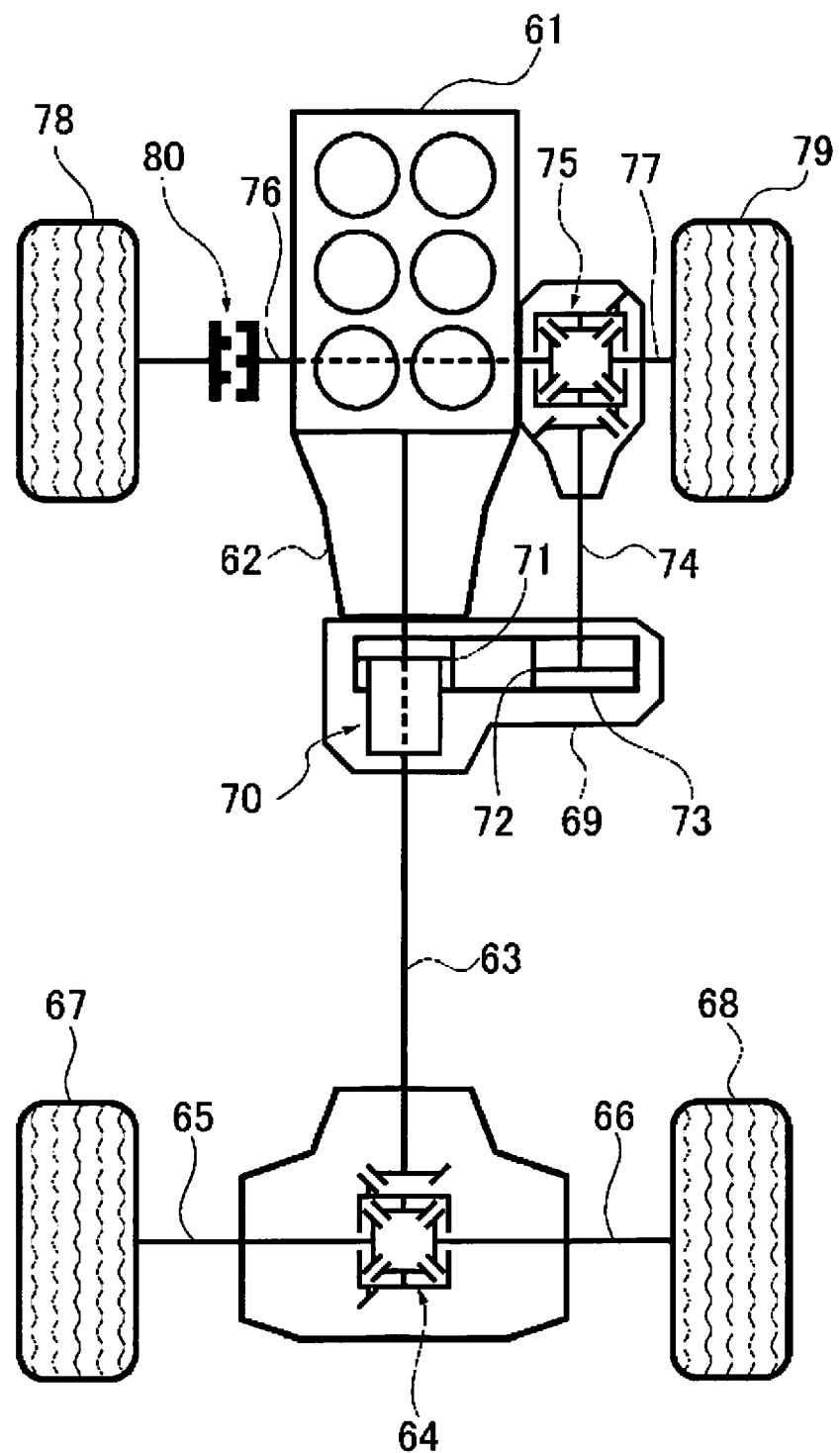
FIG. 9 is a block view of the drive system illustrating the configuration of the drive system of a rear wheel drive based four-wheel drive vehicle to which is applied the clutch control device of the third embodiment.

FIG. 9 illustrates the configuration of the drive system of a rear wheel drive based four-wheel drive vehicle to which is applied the clutch control device. The drive system configuration of the four-wheel drive vehicle will be described below based on FIG. 9.

The rear wheel drive system of the four-wheel drive vehicle is provided with a transverse engine 61 (drive source), a transmission 62, a rear propeller shaft 63, a rear differential 64, a left rear wheel drive shaft 65, a right rear wheel drive shaft 66, a left rear wheel 67 (main drive wheel), and a right rear wheel 68 (main drive wheel). That is, the drive force that has passed through the transverse engine 61 and the transmission 62 is transmitted to the left and right rear wheel drive shafts 65, 66 via the rear propeller shaft 63 and the rear differential 64, and constantly drives the left and right rear wheels 67 and 68 while allowing differential rotation.

In the front wheel drive system of the four-wheel drive vehicle, a transfer mechanism is configured to comprise, inside a transfer case 69, an electronically controlled coupling 70 (friction clutch), an input side sprocket 71, an output side sprocket 72, and a chain 73. A front propeller shaft 74 that is connected to the output side sprocket 72, a front differential 75, a left front wheel drive shaft 76, a right front wheel drive shaft 77, a left front wheel 78 (auxiliary drive wheel), and a right front wheel 79 (auxiliary drive wheel) are provided. The electronically controlled coupling 70 is disposed inside the transfer case 69 in a position upstream of the input side sprocket 71 (main drive system side position).

A dog clutch 80 (dog clutch) is disposed in an intermediate position of the left front wheel drive shaft 76, which connects the front differential 75 and the left front wheel 78. That is, the drive system is configured to be capable of selecting a two-wheel drive mode (i.e., disconnected two-wheel drive mode) in which both the electronically controlled coupling 70 and the dog clutch 80 are disengaged. The rotation of the drive system (rotation of the front propeller shaft 74, etc.) on the downstream side of the electronically controlled coupling 70 is stopped by releasing this electronically controlled coupling 70 and this dog clutch 80; it is thereby possible to suppress friction loss and oil stirring loss so that improved fuel efficiency can be realized.

Next, the difference between the first embodiment and the second embodiment will be described regarding the synchronous operation of the dog clutch 8. The first embodiment is configured so that the dog clutch 8 is disposed on the drive branch-side transmission system path and the electronically controlled coupling 16 is disposed on the auxiliary drive wheel-side transmission system path, which sandwich the rear differential 15, of the system for transmitting drive force to the left and right rear wheels 19 and 20, which are the auxiliary drive wheels. Accordingly, when there is a request to engage the dog clutch 8, which is in a disengaged state, and an engagement control of the electronically controlled coupling 16 is carried out, the left side gear of the rear differential 15 is restricted by the rotational frequency of the left rear wheel 19.

Therefore, of the three rotating members of the rear differential 15 (the left and right side gears and the differential case), the rotational frequencies of the left and right side gears are restricted; the rotational frequency of the propeller shaft 12, which is connected to the differential case, thereby takes on the average rotational frequency of the left and right rear wheels 19 and 20 (driven wheel rotational frequency). As a result, when the left and right front wheels 6 and 7 are in a non-slip state, the differential rotation speed $\Delta N$ of the dog clutch 8 becomes $\Delta N=0$. However, when the left and right front wheels 6 and 7 are in a slip state, the differential rotation speed $\Delta N$ of the dog clutch 8, which has been decreasing with time, will reach a limit at a certain differential rotation; thereafter, the clutch differential rotation speed $\Delta N$ shifts to a higher speed, and the differential rotation speed $\Delta N$ of the dog clutch 8 increases with time.

In contrast, the third embodiment is configured so that the electronically controlled coupling 70 is disposed in the drive branch-side transmission system path and the dog clutch 80 is disposed in the auxiliary drive wheel-side transmission system path, which sandwich the front differential 75, of the system for transmitting drive force to the left and right front wheels 78, 79, which are the auxiliary drive wheels. Accordingly, when there is a request to engage the dog clutch 80, which is in a disengaged state, and an engagement control of the electronically controlled coupling 70 is carried out, the differential case of the front differential 75 is restricted by the rotational frequency of the rear propeller shaft 63.

Therefore, of the three rotating members of the front differential 75 (left and right side gears and the differential case), the rotational frequencies of the right side gear (right front wheel 79) and the differential case are restricted; the rotational frequency of the left side gear will thereby be determined by two rotational frequencies. As a result, when the left and right rear wheels 67 and 68 are in a non-slip state, the differential rotation speed $\Delta N$ of the dog clutch 80 becomes $\Delta N=0$. However, when the left and right rear wheels 67 and 68 are in a slip state, the differential rotation speed $\Delta N$ of the dog clutch 80 which has been decreasing with time will be reversed across $\Delta N=0$ (zero); thereafter, the differential rotation speed $\Delta N$ of the dog clutch 80 will be increased in a reversed state. The other actions are the same as the first embodiment; thus, the descriptions thereof are omitted.

Next, the effects are described. The following effects can be obtained with the clutch control device for a four-wheel drive vehicle as recited in the third embodiment.

3-1) In the clutch control device for a four-wheel drive vehicle of the third embodiment, the electronically controlled coupling 70 as the friction clutch is disposed in a position upstream of a transfer mechanism (input side sprocket 71, output side sprocket 72, chain 73) provided at a drive branch position to the left and right front wheels 78, 79 as the auxiliary drive wheels, and the dog clutch 80 as the dog clutch is disposed in the position of the left front wheel drive shaft 76, which extends from the transfer mechanism to the left front wheel 78 as an auxiliary drive wheel, via the propeller shaft and the front differential 75. Accordingly, in addition to the effects of (1)-(4) described above, in a rear wheel drive based four-wheel drive vehicle, when the "disconnected two-wheel drive mode" is selected, it is possible effectively to suppress friction loss and oil stirring loss, so to achieve an improvement in fuel efficiency.

The clutch control device for a four-wheel drive vehicle of the present invention was described above based on the embodiments, but specific configurations thereof are not limited to these embodiments, and various modifications and additions to the design can be made without departing from the scope of the invention according to each claim in the Claims section.

Figure 10:
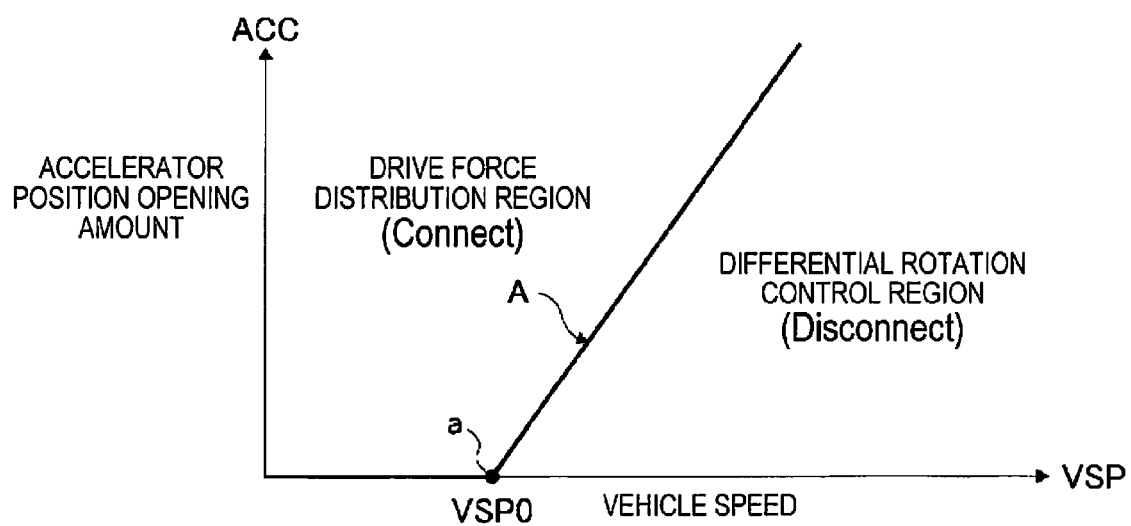
FIG. 10 is a basic map view illustrating another example of a drive mode switching map corresponding to the vehicle speed and the accelerator position opening amount used in the clutch control, when selecting "auto mode."

In the first embodiment, an example was shown in which the clutch control device of the present invention is applied to a front wheel drive based four-wheel drive vehicle (4WD engine vehicle), in which an engine is mounted as the drive source. In the third embodiment, an example was shown in which the clutch control device of the present invention is applied to a rear wheel drive based four-wheel drive vehicle (4WD engine vehicle), in which the left and right rear wheels are the main drive wheels. However, the clutch control device may be applied to a rear wheel drive based four-wheel drive vehicle in which the positional relationship of the dog clutch and the friction clutch has the relationship as in the first embodiment. In addition, the clutch control device may be applied to a front wheel drive based four-wheel drive vehicle in which the positional relationship of the dog clutch and the friction clutch has the same relationship as in the second embodiment. In addition, in the second embodiment, the two-wheel drive mode is separated into the disconnected two-wheel drive mode and the standby two-wheel drive mode; however, the two-wheel drive mode may be only the disconnected two-wheel drive mode, as illustrated in FIG. 10, in order to further secure fuel efficiency.

The invention claimed is:

1. A clutch control device for a four-wheel drive vehicle having a pair of main drive wheels and a pair of auxiliary drive wheels, which are selectively connected to a drive source, the clutch control device comprising:
   a dog clutch operatively disposed in a transmission path between the main drive wheels and the auxiliary drive wheels to separate a system for transmitting drive force to the auxiliary drive wheels from a system for transmitting drive force to the main drive wheels by releasing the dog clutch;
   a friction clutch operatively disposed in a transmission path between the main drive wheels and the auxiliary drive wheels to allocate a portion of the drive force from the drive source to the auxiliary drive wheels in accordance with a clutch engagement capacity of the friction clutch;
   an uphill sensor that detects an uphill movement; and
   a clutch control unit operatively coupled to the dog clutch and the friction clutch to selectively carry out an engagement and disengagement control of the dog clutch and an engagement and disengagement control of the friction clutch in accordance with a vehicle state that is detected by the uphill sensor, and which can switch between a two-wheel drive mode in which only the main drive wheels are driven and a four-wheel drive mode in which the main drive wheels and the auxiliary drive wheels are driven,
   the clutch control unit being programmed to selectively establish a disconnected two-wheel drive mode in which both clutches are released, and a standby two-wheel drive mode in which the dog clutch is engaged and the friction clutch is released, and
   wherein, when the uphill movement is detected during the disconnected two-wheel drive mode, the control unit switches the mode to the standby two-wheel drive mode.

2. The clutch control device as recited in claim 1, wherein the clutch control unit is further programmed to establish the two-wheel drive mode when a differential rotation is not generated between the main drive wheels and the auxiliary drive wheels, the clutch control unit is further programmed to switch to the four-wheel drive mode when the differential rotation is generated, and the clutch control unit is further programmed to execute an automatic switching control that establishes the disconnected two-wheel drive mode when in the two-wheel drive mode.

3. The clutch control device according to claim 2, wherein the main drive wheels are configured as left and right front wheels.

4. The clutch control device according to claim 2, wherein the uphill sensor is configured to detect the uphill movement based on a vehicle speed and a longitudinal acceleration of the vehicle.

5. The clutch control device according to claim 2, wherein the dog clutch is disposed upstream of a transfer mechanism provided at a drive branch position to the auxiliary drive wheels, and
   the friction clutch is disposed in a drive shaft of one of the auxiliary drive wheels which extends from the transfer mechanism that is connected to a propeller shaft and a differential.

6. The clutch control device according to claim 2, wherein the friction clutch is disposed upstream of a transfer mechanism provided at a drive branch position to the auxiliary drive wheels, and
   the dog clutch is disposed in a drive shaft of one of the auxiliary drive wheels which extends from the transfer mechanism that is connected to a propeller shaft and a differential.

7. The clutch control device as recited in claim 1, wherein the main drive wheels are configured as left and right front wheels.

8. The clutch control device according to claim 7, wherein the uphill sensor is configured to detect the uphill movement based on a vehicle speed and a longitudinal acceleration of the vehicle.

9. The clutch control device according to claim 7, wherein the dog clutch is disposed upstream of a transfer mechanism provided at a drive branch position to the auxiliary drive wheels, and
   the friction clutch is disposed in a drive shaft of one of the auxiliary drive wheels which extends from the transfer mechanism that is connected to a propeller shaft and a differential.

10. The clutch control device according to claim 7, wherein
    the friction clutch is disposed upstream of a transfer mechanism provided at a drive branch position to the auxiliary drive wheels, and
    the dog clutch is disposed in a drive shaft of one of the auxiliary drive wheels which extends from the transfer mechanism that is connected to a propeller shaft and a differential.

11. The clutch control device as recited in claim 1, wherein
    the uphill sensor is configured to detect the uphill movement based on a vehicle speed and a longitudinal acceleration of the vehicle.

12. The clutch control device according to claim 11, wherein
    the dog clutch is disposed upstream of a transfer mechanism provided at a drive branch position to the auxiliary drive wheels, and
    the friction clutch is disposed in a drive shaft of one of the auxiliary drive wheels which extends from the transfer mechanism that is connected to a propeller shaft and a differential.

13. The clutch control device according to claim 11, wherein
- the friction clutch is disposed upstream of a transfer mechanism provided at a drive branch position to the auxiliary drive wheels, and
- the dog clutch is disposed in a drive shaft of one of the auxiliary drive wheels which extends from the transfer mechanism that is connected to a propeller shaft and a differential.

14. The clutch control device as recited in claim 1, wherein
- the dog clutch is disposed upstream of a transfer mechanism provided at a drive branch position to the auxiliary drive wheels, and
- the friction clutch is disposed in a drive shaft of one of the auxiliary drive wheels which extends from the transfer mechanism that is connected to a propeller shaft and a differential.

15. The clutch control device as recited in claim 1, wherein
- the friction clutch is disposed upstream of a transfer mechanism provided at a drive branch position to the auxiliary drive wheels, and
- the dog clutch is disposed in a drive shaft of one of the auxiliary drive wheels which extends from the transfer mechanism that is connected to a propeller shaft and a differential.

* * * * *